United States Patent [19]

Desai et al.

[11] Patent Number: 4,578,773
[45] Date of Patent: Mar. 25, 1986

[54] CIRCUIT BOARD STATUS DETECTION SYSTEM

[75] Inventors: Anil I. Desai, Saratoga; Eric C. Westerfeld, Milpitas, both of Calif.

[73] Assignee: Four-Phase Systems, Inc., Cupertino, Calif.

[21] Appl. No.: 536,914

[22] Filed: Sep. 27, 1983

[51] Int. Cl.⁴ .................. G06F 11/26; G06F 11/32
[52] U.S. Cl. .................................. 364/900; 371/15; 371/29
[58] Field of Search .............. 364/200, 900; 371/18, 371/29, 20, 15, 16

[56] References Cited

U.S. PATENT DOCUMENTS

| | | | |
|---|---|---|---|
| 3,928,830 | 12/1975 | Bellamy et al. | 371/29 |
| 4,138,599 | 2/1979 | Munter | 371/15 |
| 4,234,926 | 11/1980 | Wallace et al. | 364/900 |
| 4,365,334 | 12/1982 | Smith et al. | 371/20 |
| 4,417,336 | 11/1983 | Weilbacker | 371/20 |
| 4,453,210 | 6/1984 | Suzuki et al. | 371/16 |

FOREIGN PATENT DOCUMENTS 0001615  7/1980  PCT Int'l Appl. No. ........... 371/29

*Primary Examiner*—James D. Thomas
*Assistant Examiner*—William G. Niessen
*Attorney, Agent, or Firm*—Walter W. Nielsen

[57] ABSTRACT

In an electronic system, such as a digital data processing system, comprising a number of circuit boards, each circuit board being of a particular functional type and also uniquely identifiable by a manufacturing revision number, there is provided a status detection circuit for polling various programmable status information from the board, including a unique board identity number and the manufacturing revision number. The status detection circuit includes a microcomputer (60, FIG. 2) on each board 50. The data inputs of the microcomputer are responsive to a unique combination of switches (e.g., 42) representative of the manufacturing revision number. Other microcomputer inputs are responsive to a unique combination of edge connectors (e.g., 47) for uniquely identifying the particular board in the system. Another microcomputer input is responsive to an on-board status indicator, such as an LED. The status detection circuit can sequentially address each of the circuit board microcomputers and input any of several commands to them. For example, each board identity number, manufacturing revision level, and LED status can be read. Each board microprocessor can also be commanded to output any of several types of control signals, such as power on reset, system reset, set LED, and reset LED.

1 Claim, 2 Drawing Figures

CIRCUIT BOARD STATUS DETECTION SYSTEM

TECHNICAL FIELD

This invention relates generally to an electronic system, and, in particular, to a system for polling the status of one or more circuit boards in an electronic system.

BACKGROUND OF THE INVENTION

The present invention concerns a system for polling various status indications of one or more circuit boards in an electronic system.

There are many known electronic systems which are packaged in a configuration which comprises several different printed circuit boards interconnected by insertion into a common backplane or backpanel. Each circuit board may be of a different physical and/or functional type. For example, in a data processing system the boards may comprise a CPU board, memory board, memory controller board, terminal controller board, communications board, service system board, power supply board, etc.

It is common in the electronic industry to make hardware revisions to an equipment model following its first production release. Such revisions may be made for various purposes such as to correct errors in the original version, to make functional improvements, to expand upon original functions, to utilize newer, alternative, improved, and/or less expensive circuit components, and so on.

With particular regard to a business which primarily leases, rather than sells, electronic equipment, when old leased equipment is returned to the manufacturer/lessor and is upgraded to have the operational capabilities of newer manufactured equipment, many substantial hardware revisions may be made to such old equipment. It is highly desirable to provide to a service technician the most precise identity possible of the equipment to be serviced.

To service and maintain electronic equipment, it is known to utilize either a built-in or remote service system for the purposes of conducting a self-test on the major system functions and for providing an indication of whether the equipment is operating correctly or not.

In a service environment involving a large number of complex electronic systems having various internal functional configurations and various manufacturing or remanufacturing dates, the proper diagnosing and servicing of such systems poses considerable problems in terms of informing the built-in or remote service system about the identity and operational status of the various system boards. For example, whether a service status inquiry is initiated from a local or remote service terminal, such terminal has to know what types of electronic boards it is examining in order to know whether they are operating properly. Also the service terminal has to know the manufacturing date, manufacturing revision number, or equivalent of each electronic board it examines.

As for the actual indication of the operational status of the electronic system boards or components, the range of sophistication is broad and may range, for example, from a circuit which merely activates an error light or audible warning to one which performs errorlogging, records various performance statistics, and reads and writes data to registers or memory on the boards.

As electronic systems become increasingly complex, the costs of servicing such systems are constantly rising. It would obviously be of considerable commercial value to be able to significantly improve the serviceability of such equipment. Significant improvements include, for example, reducing the time required for diagnosis and error identification, providing more accurate identification of the sources of errors, and providing more accurate identification of the categories of errors.

It would also be desirable to be able to issue certain commands to the board—for example, to reset either the board or the entire system upon command from not only the local terminal but especially the remote terminal, after an error has occurred which has halted operation of the system.

BRIEF SUMMARY OF INVENTION

Accordingly, it is an object of the present invention to provide an improved circuit board status detection system.

It is also an object of the present invention to provide a circuit board status detection system which indicates a unique identity number for each circuit board in an electronic system.

It is a further object of the present invention to provide a circuit board status detection system which indicates the manufacturing revision number of each circuit board in an electronic system.

It is yet another object of the present invention to provide a circuit board status detection system which indicates operational errors which have occurred in the electronic components on each circuit board.

It is still another object of the present invention to provide a circuit board status detection system in which a reset command may be transmitted to either a given circuit board or to the entire system.

These and other objects are achieved in accordance with a preferred embodiment of the invention by providing in an electronic system comprising at least one uniquely identifiable circuit board, programmable status indicating means for providing an indication of the status of the circuit board, and means for polling the programmable status indicating means.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE INVENTION

Figure 1:
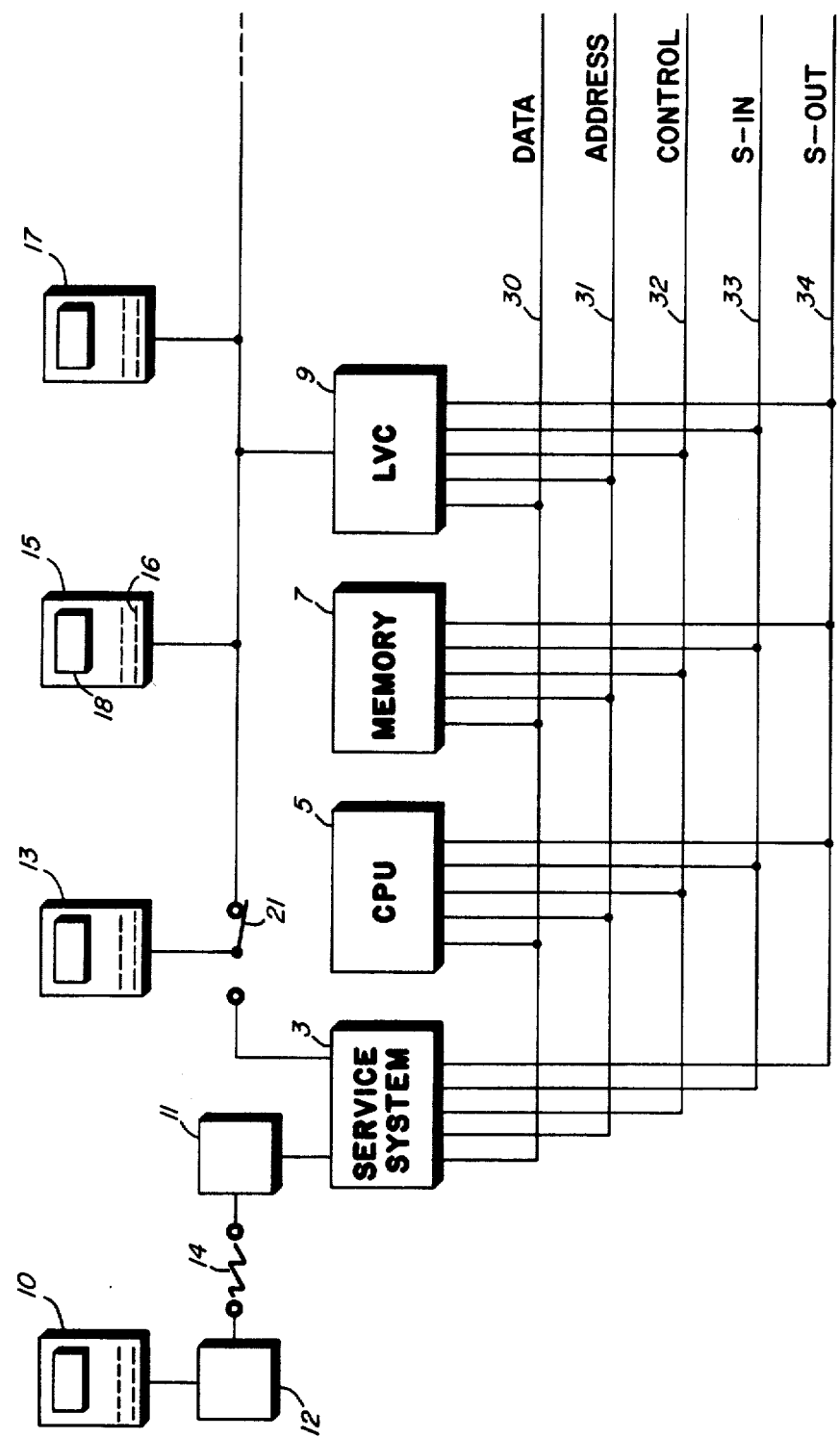
FIG. 1 shows a block diagram illustrating a preferred embodiment of a circuit board status detection system according to the present invention.

Referring now to FIG. 1, a block diagram of the circuit board status detection system of the present invention is shown.

An electronic system, more specifically a data processing system, is shown comprising a number of individual electronic circuit boards, including CPU board 5, memory board 7, local video controller (LVC) board 9, and service system board 3. It will be understood that the type of system depicted and the boards shown are merely illustrative, and that the principles of the present invention apply to any type of electronic system employing circuit boards or other definable basic circuit packages.

In the system shown in FIG. 1, the circuit boards are electrically interconnected by several busses, including a data bus 30, address bus 31, control bus 32, status-in (S-IN) line 32, and status-out (S-OUT) line 33. It will be understood that data bus 30, address bus 31, and control bus 32 may actually comprise multiple conductive lines, and that they have been illustrated as single lines in FIG. 1 for the sake of simplicity. It will also be understood that the individual boards may be electrically interconnected by means of a common backplane or backpanel (not shown) containing portions of busses 30-34. Mating connectors on the board and backplane may be used to make the physical connection.

In the system illustrated in FIG. 1, a plurality of user terminals 13, 15, and 17 are interfaced to the rest of the system by the LVC 9 in a well known way. The terminals may contain a keyboard 16 and video display screen 18.

The service system 3 provides the interface between the individual electronic boards and the local or remote service terminals. Local terminal 13 may comprise a user terminal 13 whose connection to the LVC 9 may be temporarily switched to the service system 3 by means of switch 21. Remote terminal 10 may be connected to the service system 3 by appropriate means— for example, by means of modems 11 and 12 and telephone line 14. Using remote terminal 10, a service operator may diagnose errors in the electronic system from any location, and, if appropriate, he may transmit certain commands to the service system as well as to the individual boards.

Figure 2:
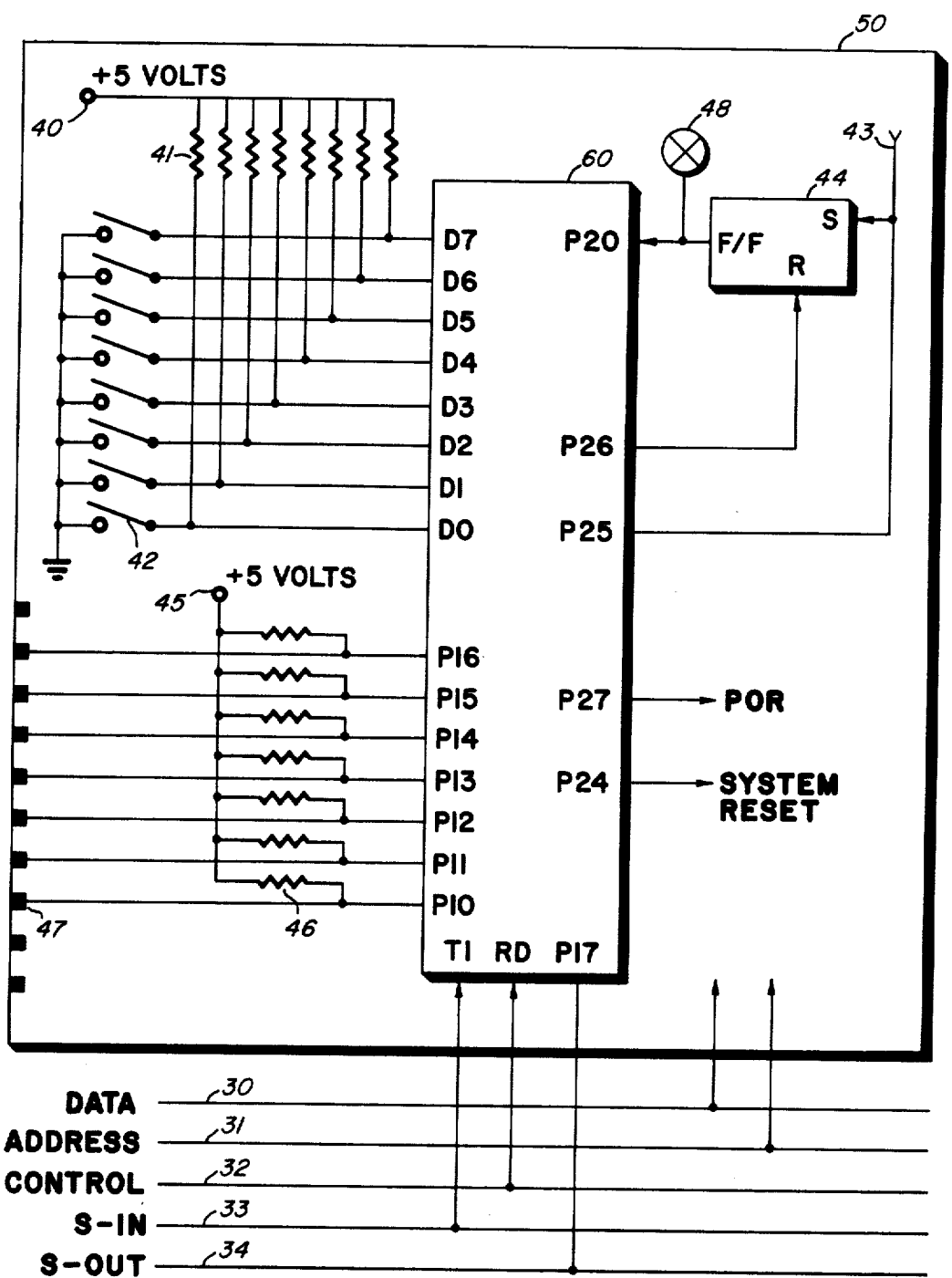
FIG. 2 shows a circuit schematic of a portion of an individual circuit board of the circuit board status detection system of the present invention.

Referring now to FIG. 2, a circuit schematic of a portion of an individual circuit board 50 of the circuit board status detection system of the present invention is shown. It will be understood that in general each circuit board will contain the status identification and polling circuitry shown for the board illustrated in FIG. 2. However, it is not necessary to implement such circuitry on every board, and such circuitry may be implemented on only one board or system component if so desired.

According to a preferred embodiment of the invention, the board contains, in addition to its population of integrated circuits and other components, a microcomputer circuit 60. In the preferred embodiment this takes the form of an Intel 8041A/8741A microcomputer. It will be understood that other equivalent devices may be used. Microcomputer 60 stores various indications of the status of the board and transmits the status information through the service system 3 to the service operator upon receipt of a polling request.

Microcomputer 60 has its data inputs D0-D7 coupled to one side of each of a plurality of switches such as switch 42. The other side of each switch is coupled to ground. Each data input line is also coupled through a resistor, such as resistor 41, to a voltage source, such as +5 volt source 40. When any given switch is open, the +5 volt source is applied to the corresponding data input terminal of microcomputer 60. When the switch is closed, the corresponding data input terminal is coupled to ground. By closing selected ones of the switches a unique number may in effect be programmed. This number may represent, for example, the manufacturing revision number of the board. It will be appreciated that the series of switches may be implemented in other ways as well, such as by a code plug or by a mask pattern printed on the board inself.

Microcomputer 60 has its "RD" terminal connected to Control line 32. When a read signal is transmitted over Control line 32, each microcomputer 60 reads the manufacturing revision number which is programmed into the switches coupled to its D0-D7 data inputs.

Microcomputer 60 has terminals P10-P16 of its I/O port each coupled to an electrical contact on the edge of circuit board 50. It will be understood that there may be several hundred electrical contacts on the edge of circuit board 50, which contacts mate with corresponding contacts on the common backplane. Terminals P10-P16 are coupled to eight of these electrical contacts. Terminals P10-P16 are also each coupled to a +5 volt source through a resistor, such as resistor 46. By selectively grounding or not grounding the electrical contacts 47, the P10-P16 terminals may be correspondingly grounded or coupled to the +5 volt supply. In this way, the board may be assigned a unique number indicating the identity of the circuit board—e.g. memory board #1, memory board #2, memory controller board, CPU board, etc.

A service operator can address any one of the system boards (FIG. 1) through the service system board 3 and issue any of several status commands to such board. The address and command information are contained in a serial packet which is transmitted by the service system board 3 over the S-IN line 33 to the T1 terminal of the microprocessor 60 on each board. The packet may assume any convenient form, but in the preferred embodiment it comprises an initial 8-bit address byte, a parity bit, a byte indicating the length of the remainder of the packet, and an 8-bit command byte.

The address byte must match the unique identity number corresponding to the P10-P16 inputs. The types of command bytes include "Read Revision Number" command, "Read Board Identity Number" command, "Read Dead LED Status" command, "Power On Reset" command, "System Reset" command, "Set Dead LED" command, and "Reset Dead LED" command.

In response to a read command, microcomputer 60 outputs a packet over line S-OUT from its P17 I/O terminal. This output packet is then read and interpreted appropriately by service system 3. The S-IN line 33 and S-OUT line 34 interconnect all boards in the system. A packet sent by the service system 3 over S-IN line 33 will be directed to all boards, but only the board with the proper address will respond to the packet. Likewise, an output packet generated by one of the boards over S-OUT line 34 will be routed to all boards but only be decoded by the service system 3.

The P20 I/O terminal of microcomputer 60 is coupled to an indicator of the operational status of the board. For example, by means of an output signal over lead 43 from a suitable well known on-board circuit (not shown) for monitoring each major component of the board, "Dead LED" flip-flop 44 may be set upon the occurrence of a malfunction. The output of flip-flop 44 may turn on an indicator such as a light or audible warning. In the preferred embodiment, a light emitting diode (LED) 48 is provided on each circuit board which is activated if any major component malfunctions. The "Dead LED" signal input is also coupled to I/O terminal P20 of microcomputer 60 and may be read by the service system 3 in response to a "Read Dead LED Status" command. It will be apparent that in addition to the "Read Dead LED Status" command, other more specific commands may be included and other malfunction detection circuitry may be provided to give the status of any given board component.

Microcomputer 60 can be commanded to generate a "Reset LED" control signal at its P26 I/O terminal. This signal resets the "Dead LED" flip-flop 44. In addition, microcomputer can be commanded to generate a "Set LED" control signal at its P25 I/O terminal, which signal sets flip-flop 44 in the same fashion as an output signal over lead 43. The "Set LED" control signal may be used by a service operator at either local terminal 13 or remote terminal 10 to test the operation of the "Dead LED" function of the circuit board status detection system.

Microcomputer 60 can also be commanded to generate a "Power On Reset (POR)" control signal at its P27 I/O terminal, and a "System Reset" control signal at its P24 I/O terminal. In the embodiment illustrated, the "POR" control signal and the "System Reset" control signal both change state simultaneously. The "POR" signal stays on for a fixed, rather brief period of time and then turns off, and the "System Reset" signal remains on for a longer period of time, the period being programmable. While the "System Reset" signal is on, various T&D operations may be performed on the individual boards of the system, the details of which operations are not germane to this invention. Eventually the "System Reset" signal goes off, and the normal system operation begins.

The operation of the preferred embodiment of the invention will now be described. In operation, the service operator may initiate a service or status routine through either remote terminal 10 or local terminal 13. The service system 3 sends a "read" signal over Control line 32 which causes each microprocessor 60 to read the manufacturing revision number programmed into the switches coupled to its D0–D7 data terminals. Then the service system 3 sends a packet over S-IN line 33 comprising the address of one of the boards and including a "Read Revision Number" command. Only the particular board which is addressed then responds with its manufacturing revision number. The service system may send another packet including a "Read Board Identity Number" command to the same board over S-IN line 33 requesting its unique identity number, which number should correspond exactly with the board's address.

The service system may also send a "Read Dead LED Status" command to the board to determine the overall status of the board components. If the "Dead LED" signal is set then the fact that an error or malfunction has occurred on the board will be sent back to the service operator via the service system 3.

As mentioned above, the service operator may also initiate the "Power On Reset" command, "System Reset" command, "Set Dead LED" command, and "Reset Dead LED" command to the board.

Each board in the system is polled in turn until all available status information on all the system boards has been acquired by the service operator.

It will be apparent to those skilled in the art that the disclosed circuit board status detection system herein disclosed may be implemented in many embodiments other than the preferred form specifically set out and described above.

For example, it will be apparent that, by means of appropriate circuitry, data may be transmitted either serially or in parallel to the microprocessor 60 of any circuit board to test the function of on-board components such as individual registers or memory. In addition, commands may be provided for reading the contents of such registers or memory or for beginning the execution of an on-board program routine.

Accordingly, it is intended by the appended claims to cover all modifications of the invention which fall within the true spirit and scope of the invention.

What is claimed is:

1. An electronic system comprising:
    bus means comprising means for conveying information, including address, data, and control information;
    at least one circuit board coupled to said bus means, said circuit board comprising:
        electronic circuitry for performing a predetermined function;
        means for uniquely identifying said circuit board, said identifying means comprising first and second programmable digital switch means for encoding first and second digital numbers, respectively, said first digital number uniquely identifying the function of said circuitry, and said second digital number uniquely identifying a manufacturing history for said circuit borad;
        status signal generating means responsive to said circuitry for generating a status signal in response to the occurrence of at least one predetermined type of condition existing in said circuitry;
        status signal storage means responsive to said status signal generating means for storing said status signal; and
    reset means coupled to said circuitry for initiating a reset operation of said circuitry; and
    a processing unit coupled to said bus means, said processing unit comprising:
        means for polling said circuit board, said polling means comprising means for reading said first and second digital numbers and means for determining whether said status signal is stored in said status signal storage means; and
        means for generating a command to said reset means, causing a reset operation of said circuitry to be initiated.

* * * * *